(12) United States Patent
Ishishita et al.

(10) Patent No.: US 9,475,480 B2
(45) Date of Patent: Oct. 25, 2016

(54) BATTERY CHARGE/DISCHARGE CONTROL DEVICE AND HYBRID VEHICLE USING THE SAME

(75) Inventors: Teruo Ishishita, Miyoshi (JP); Junta Izumi, Toyota (JP); Ko Nozaki, Toyota (JP); Hitoshi Sakai, Nagoya (JP); Takashi Kuzuya, Nagoya (JP); Kiyohito Machida, Aichi-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1195 days.

(21) Appl. No.: 13/003,525

(22) PCT Filed: Jul. 10, 2009

(86) PCT No.: PCT/JP2009/062600
§ 371 (c)(1),
(2), (4) Date: Jan. 10, 2011

(87) PCT Pub. No.: WO2010/005079
PCT Pub. Date: Jan. 14, 2010

(65) Prior Publication Data
US 2011/0127958 A1 Jun. 2, 2011

(30) Foreign Application Priority Data

Jul. 11, 2008 (JP) ................................ 2008-181789
Jan. 13, 2009 (JP) ................................ 2009-004243

(51) Int. Cl.
*H02J 7/04* (2006.01)
*B60W 10/26* (2006.01)
(Continued)

(52) U.S. Cl.
CPC ............ *B60W 10/26* (2013.01); *B60L 11/187* (2013.01); *B60L 11/1862* (2013.01);
(Continued)

(58) Field of Classification Search
USPC ........................................................ 320/132
See application file for complete search history.

(56) References Cited

U.S. PATENT DOCUMENTS 5,908,715 A * 6/1999 Liu et al. ...................... 429/217
7,023,107 B2 * 4/2006 Okuda et al. ................. 320/104
(Continued)

FOREIGN PATENT DOCUMENTS

| JP | 06-153314 A | 5/1994 |
| JP | 2006-340447 A | 12/2006 |
| JP | 2006-345634 A | 12/2006 |

*Primary Examiner* — Robert Grant
(74) *Attorney, Agent, or Firm* — Sughrue Mion, PLLC

(57) ABSTRACT

A battery charge/discharge control device (20) includes an input-enabled power adjustment unit (40) having an input-enabled current value calculation unit (42) and an input power limit value calculation unit (44). The input-enabled current value calculation unit (42) uses a battery current value, a battery temperature value, and an estimated charge capacity value at the time "t" upon execution of detection, so as to obtain an input-enabled current value reduction amount per unit time during charge and an enabled current amount recovery amount per unit time when being left uncontrolled. Moreover, the input-enabled current value calculation unit (42) calculates an input-enabled current value $I_{lim}(t)$ to a battery (10) according to the previously calculated input-enabled current value $I_{lim}(t-1)$ which has been calculated previously or the only initially set input-enabled current value The input power limit value calculation unit (44) calculates the battery input power limit value so that the input current limit target value obtained in accordance with the input-enabled current value $I_{lim}(t)$ is greater than an actual battery current value. Thus, the input-enabled power to the battery (10) is adjusted in accordance with the battery input power limit value.

15 Claims, 11 Drawing Sheets

(51) Int. Cl.

| | |
|---|---|
| *B60L 11/18* | (2006.01) |
| *B60W 10/06* | (2006.01) |
| *B60W 10/08* | (2006.01) |
| *B60W 20/00* | (2016.01) |
| *H01M 10/0525* | (2010.01) |
| *H01M 10/44* | (2006.01) |
| *H01M 10/48* | (2006.01) |
| *H02J 7/00* | (2006.01) |

(52) U.S. Cl.
CPC .......... *B60L 11/1887* (2013.01); *B60W 10/06* (2013.01); *B60W 10/08* (2013.01); *B60W 20/00* (2013.01); *H01M 10/0525* (2013.01); *H01M 10/44* (2013.01); *H01M 10/48* (2013.01); *H01M 10/486* (2013.01); *H02J 7/0073* (2013.01); *B60L 2240/423* (2013.01); *B60W 2510/244* (2013.01); *B60W 2510/246* (2013.01); *B60W 2520/10* (2013.01); *B60W 2540/12* (2013.01); *B60W 2710/0666* (2013.01); *B60W 2710/083* (2013.01); *Y02E 60/122* (2013.01); *Y02T 10/6286* (2013.01); *Y02T 10/642* (2013.01); *Y02T 10/705* (2013.01); *Y02T 10/7011* (2013.01); *Y02T 10/7044* (2013.01); *Y02T 90/34* (2013.01)

(56) References Cited

U.S. PATENT DOCUMENTS

| | | | |
|---|---|---|---|
| 2007/0194756 | A1* | 8/2007 | Cutrona .................... 320/132 |
| 2008/0122399 | A1* | 5/2008 | Nishino et al. ............ 320/103 |
| 2010/0072951 | A1* | 3/2010 | Nakashima ................ 320/145 |

* cited by examiner

BATTERY CHARGE/DISCHARGE CONTROL DEVICE AND HYBRID VEHICLE USING THE SAME

TECHNICAL FIELD

The present invention relates to a battery charge/discharge control device, and to a hybrid vehicle having the same.

BACKGROUND ART

In motor-driven vehicles, drive wheels connected to a motor which is driven by a battery are braked by means of a regenerative braking force. At this time, electric power generated by the motor is recovered by using the power to charge the battery. However, if the battery is excessively charged with the electric power obtained by regeneration, the battery becomes overcharged. In order to avoid this state, there has been proposed a battery charge control device which controls battery charge such that the battery voltage does not exceed the battery voltage limit (see, Patent Document 1, for example).

PRIOR ART DOCUMENT

Patent Document 1: JP 6-153314 A

SUMMARY OF THE INVENTION

Technical Problems

In general, lithium ion secondary batteries have a high energy density, and the initial open circuit voltage and average operating voltage thereof are higher than those of other secondary batteries. Accordingly, the lithium ion secondary batteries are suitable for a power source system for hybrid vehicles, which requires a large battery capacity and a high voltage. Further, by virtue of their approximately 100% Coulomb efficiency, the lithium ion secondary batteries have high charge/discharge efficiently and are therefore advantageous in that more effective use of energy is possible as compared with other secondary batteries.

However, there is a possibility that a lithium (Li) metal precipitates on a surface of the negative electrode of a lithium ion secondary battery during use (e.g., high-rate charging, charging from a high state of charge (SOC), continuous charge for a long period of time, or charging at a low temperature (charging in a high resistance state)). This may result in overheat or reduction in performance of the lithium ion secondary battery.

Solution to Problems

The battery charge/discharge control device and a hybrid vehicle having the same have the following features.

(1) A battery charge/discharge control device includes an input-enabled power adjustment unit which adjusts, during charge and discharge, based on a charge history, input-enabled power to a battery formed of a lithium ion secondary battery, such that a negative electrode potential of the battery is not lowered to a lithium reference potential.

(2) The input-enabled power adjustment unit determines the input-enabled power based on an enabled charge current which is set as a maximum current at which metal lithium does not precipitate on the negative electrode, and changes the enabled charge current such that the enabled charge current decreases in accordance with a charge continuation time and increases in accordance with a discharge continuation time.

(3) The input-enabled power adjustment unit determines the input-enabled power based on an input current limit target value which is obtained by offsetting the enabled charge current by a predetermined amount.

(4) The battery charge/discharge control device further includes a battery current detection unit which detects a battery current, a battery temperature detection unit which detects a battery temperature, and a charge/discharge estimation unit which estimates a state of charge of the battery, wherein the input-enabled power adjustment unit includes an input-enabled current value calculation unit which uses a battery current value, a battery temperature value, and an estimated charge capacity value at a time t upon execution of detection, so as to obtain an input-enabled current value reduction amount per unit time during charge or an input-enabled current value recovery amount per unit time during discharge and also an enabled current amount recovery amount per unit time when being left uncontrolled, and calculates an input-enabled current value $I_{lim}(t)$ for the battery, based on a previously calculated input-enabled current value $I_{lim}(t-1)$ which has been calculated previously or an only initially set input-enabled current value $I_{lim}(0)$, and an input power limit value calculation unit which calculates a battery input power limit value based on the input-enabled current value $I_{lim}(t)$ which is obtained, and the input-enabled power adjustment unit adjusts the input-enabled power to the battery based on the battery input power limit value which is obtained.

(5) The input power limit value calculation unit calculates the battery input power limit value based on an input current limit target value obtained by decreasing the input-enabled current value $I_{lim}(t)$ by a predetermined amount.

(6) The input-enabled current value calculation unit further calculates an input-enabled current value $I_{lim}'(t)$ for the battery, obtained by adding a degradation state of the lithium ion secondary battery to the input-enabled current value $I_{lim}(t)$ which is obtained, and the input power limit value calculation unit calculates the battery input power limit value based on the input-enabled current value $I_{lim}'(t)$ which is obtained.

(7) The input power limit value calculation unit obtains an input current limit target value by adding a degradation state of the lithium ion secondary battery to the input-enabled current value $I_{lim}(t)$ which is obtained.

(8) The input power limit value calculation unit obtains an input current limit target value by adding a degradation state of the lithium ion secondary battery to the input-enabled current value $I_{lim}'(t)$ which is obtained.

(9) The input power limit value calculation unit calculates a battery input power limit value $W_{in}(t)$ from a difference between a power value in accordance with a difference between the input current limit target value and an actual battery current value, and a predetermined battery input power limit prescribed value $SW_{in}(t)$.

(10) The battery charge/discharge control device further includes an upper limit voltage control unit which executes control such that an upper limit voltage of the lithium ion secondary battery does not exceed a predetermined upper limit voltage.

(11) The input-enabled power adjustment unit calculates an input power to the battery which is obtained when the enabled charge current flows and determines the input-enabled power based on the input power which is calculated.

(12) The input-enabled power adjustment unit further obtains a battery voltage $V_{tag}(t)$ which is obtained when the input current limit target value $I_{tag}(t)$ is set to a charge current, calculates a base power $SW_{in}'(t)$ from the input current limit target value $I_{tag}(t)$ and the voltage $V_{tag}(t)$, and determines the input-enabled power to the battery based on the base power $SW_{in}'(t)$ and a difference between the input current limit target value $I_{tag}(t)$ and an actual battery current value.

(13) The battery charge/discharge control device includes a use period storage unit which stores a period of use which is counted in a cumulative manner from a time when the battery is mounted, wherein the input-enabled power adjustment unit changes the degradation state of the lithium ion secondary battery in accordance with the period of use of the battery which is obtained from the use period storage unit.

(14) A hybrid vehicle which includes a motor and an engine and travels by a driving force of at least one of the motor and the engine, the hybrid vehicle including a battery formed of a lithium ion secondary battery, which supplies power to the motor and also stores electric power due to regenerative energy, and the battery charge/discharge control device described above.

Advantageous Effects of Invention

According to the present invention, it is possible to adjust input electric power in accordance with a state of the battery even when charging continues for a long period of time, for example. Consequently, it is possible to suppress overcharge to a battery composed of a lithium ion secondary battery, to thereby avoid overheat and a reduction in the performance of the battery.

BRIEF DESCRIPTION OF THE DRAWINGS

These and other objects of the invention will be explained in the description below, in connection with the accompanying drawings, in which.

BEST MODE FOR CARRYING OUT THE INVENTION

A preferred embodiment of the present invention will be described with reference to the drawings.

Figure 1:
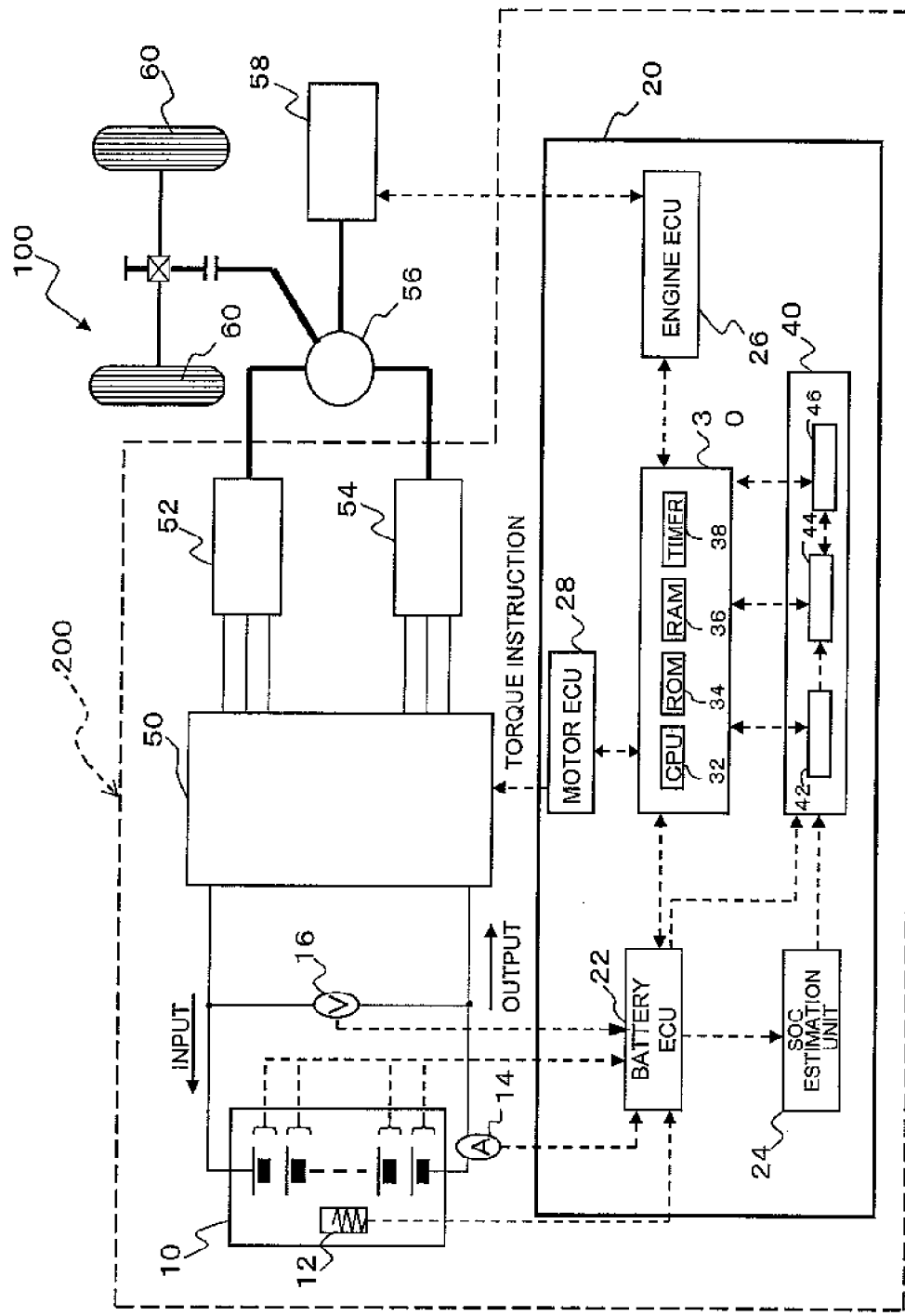
FIG. 1 is a view schematically illustrating a structure of a battery charge/discharge control device according to one embodiment of the present invention, a structure of a hybrid vehicle, and a charge/discharge structure of a mobile terminal.

FIG. 1 illustrates an example structure of a battery charge/discharge control device according to an embodiment of the present invention, which is used for a hybrid vehicle. Here, a battery as used in the present specification refers to a lithium ion secondary battery, and the "lithium ion secondary battery" as used in the present specification encompasses a lithium ion secondary battery in which an electrolytic solution is used as an electrolyte, and a lithium polymer battery in which a polymer gel is used as an electrolyte.

As illustrated in FIG. 1, a battery charge/discharge control device 20 according to the present embodiment includes a battery electronic control unit 22 (hereinafter referred to as a "battery ECU 22") which monitors a state of a battery 10, an SOC estimation unit 24 which estimates a state of charge (SOC) of the battery 10, a motor electronic control unit 28 (hereinafter referred to as a "motor ECU 28") which controls driving of a motor 52, an engine electronic control unit 26 (hereinafter referred to as an "engine ECU 26") to which signals from various sensors that detect an operation state of an engine 58 are input and which performs operation control such as fuel injection control, ignition control, and suction air quantity adjustment control with respect to the engine 58, a hybrid electronic control unit 30 (hereinafter referred to as an "HVECU 30") which controls an overall power output device, and an input-enabled power adjustment unit 40 which adjusts, at the time of charge and discharge, an input-enabled power to a battery formed of a lithium ion secondary battery, such that the negative electrode potential is not lowered to the lithium reference potential, based on a charge/discharge history.

Figure 2:
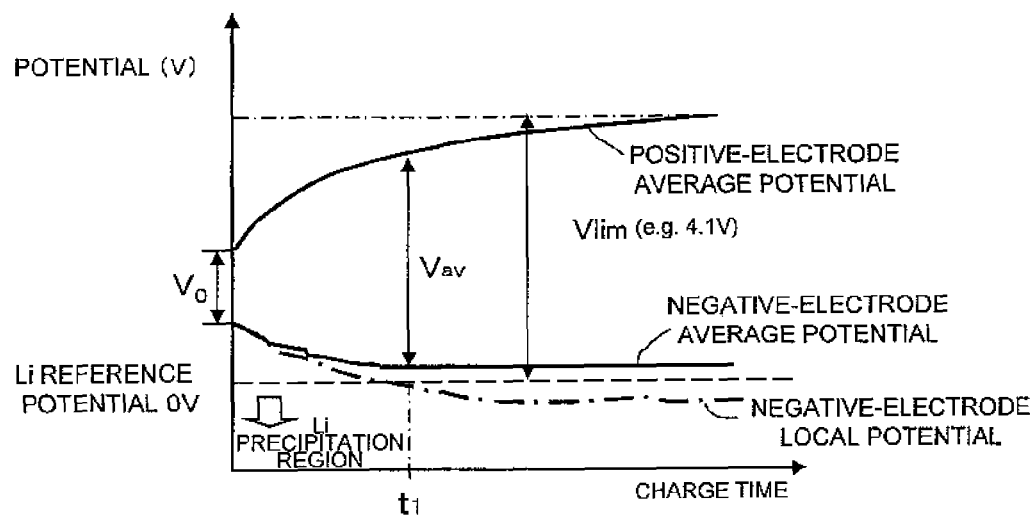
FIG. 2 is a view for explaining a charging time and transition of a positive electrode potential and a negative electrode potential of a lithium ion secondary battery.

As illustrated in FIG. 2, in a lithium ion secondary battery which is used as the battery 10, with continuous charge, the positive electrode average potential increases whereas the negative electrode average potential decreases, resulting in a large potential difference (Vav) between the positive electrode and the negative electrode. Here, it is known that Li metal precipitates on the negative electrode surface when the negative electrode potential is a Li reference potential (0V) or less. Accordingly, conventionally, at the time of charging a lithium ion secondary battery, the terminal voltage between the positive and negative electrodes, which is a potential difference in the average potentials between the positive and negative electrodes, is controlled to remain within a predetermined potential (e.g. 4.1V), thereby avoiding precipitation of Li metal on the negative electrode.

However, the present inventors have noted that, due to the reaction variations in cells (the positive and negative electrode surfaces) within a battery, there is a possibility that, even if the potential difference (Vav) between the positive and negative average potentials is within a predetermined potential (Vlim), as is the case after time t1 shown in FIG. 2, the negative electrode potential of a local portion on the negative electrode (which will be referred to as a negative electrode local potential) reaches the Li reference potential (0V) or below, and Li metals may precipitate on the corresponding portion of the negative electrode surface. At the same time, the present inventors have identified that such a precipitation process of Li metal is likely to occur in the state of high-rate (e.g. 20C or more) charge, high state of charge (high SOC), long-time continuous charge, or the state of low temperature charge (a state with high internal resistance of battery cells).

Figure 3:
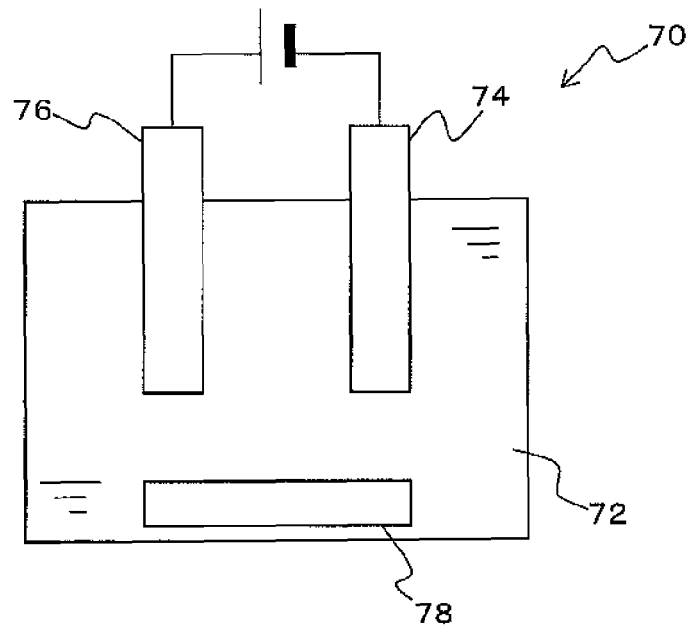
FIG. 3 is a view schematically illustrating an example structure of a lithium ion secondary battery.

As illustrated in FIG. 3, a cell potential is a potential difference between a positive electrode 74 and a negative electrode 76 in a cell of a lithium ion secondary battery. The negative electrode potential is a potential difference between the negative electrode 76 and a Li reference electrode 78 (potential 0V), and the positive electrode potential is a potential difference between the positive electrode 74 and the Li reference electrode 78 (potential 0V). Further, while it can be considered that the positive electrode average potential is reduced so as to prevent the potential difference from falling below the Li reference potential, there is a possibility, in this case, that performances required for the battery cannot be satisfied.

Accordingly, the battery charge/discharge control device 20 according to the present embodiment includes the input-enabled power adjustment unit 40 so as to suppress the negative electrode potential from reaching the Li reference potential 0V even locally.

The battery charge/discharge control device 20 according to the present embodiment further includes a current sensor 14 for detecting a battery current, and a temperature sensor 12 which is provided within the battery 10 for detecting the battery temperature illustrated in FIG. 1, in order to calculate a power value which can be input to the battery by the input-enable power adjustment unit 40, as will be described below.

Each of the structures described above will be described in detail. The battery ECU 22 receives and stores therein a signal which is necessary for controlling the battery, such as a terminal-to-terminal voltage from a voltage sensor which is not shown and which is provided between the terminals of the battery 10, a charge/discharge electric current (hereinafter also referred to as a "battery current") from the current sensor 14 mounted on a power line connected to the output terminal of the battery 10, a battery temperature Tb from the temperature sensor 12 mounted on the battery 10, and so on, which are input thereto. The SOC estimation unit 24 also estimates a state of charge (SOC, remaining capacity) by summation of a battery current value IB(t) which is obtained from the current sensor 14 by actual measurement and is input to the battery ECU 22. Here, it is preferable that, for the summation, an estimated current value which is corrected by the measured battery temperature value TB(t) is used, and more accurate SOC estimation can be achieved by using other information such as a battery electromotive voltage.

The HVECU 30 is configured as a micro processor including a CPU 32 as a base component, and includes, in addition to the CPU 32, ROM 34 which stores a processing program, RAM 36 which temporarily stores data, and an input/output port and a communication port which are not illustrated. The HVECU 30 receives an ignition signal from an ignition switch which is not shown, a signal from an accelerator sensor which is also not shown, and signals from other sensors, and also receives information concerning the accelerator opening degree, the brake pedal depression amount, the vehicle speed, and so on. Here, the HVECU 30, based on the information concerning the accelerator opening degree, the brake pedal depression amount, the vehicle speed, and so on, determines a torque instruction, and outputs the torque instruction to the motor ECU 28 and the engine ECU 26 to control driving of the motor 52 and the engine 58 so as to correspond to the torque instruction. Further, the HVECU 30 is connected to the engine ECU 26, the motor ECU 28, and the battery ECU 22 via a communication port to thereby communicate various control signals with respect to the engine ECU 26, the motor ECU 28, and the battery ECU 22. Also, the ROM 34 stores a program for calculating the input-enabled current values $I_{lim}(t)$ and $I_{lim}'(t)$, which are calculated by the input-enabled power adjustment unit 40 as will be described below, and the battery input power limit value $W_{in}(t)$. On the other hand, the RAM 36 temporarily stores the battery current value and the battery temperature value output from the battery ECU 22, and also temporarily stores the input-enabled current values $I_{lim}(t)$ and $I_{lim}'(t)$ calculated by the input-enabled power adjustment unit 40 and the battery input power limit value $W_{in}(t)$ and further stores data necessary for various operations.

Further, the input-enabled power adjustment unit 40 includes an input-enabled current value calculation unit 42 and an input power limit value calculation unit 44, and adjusts the input-enabled power to the battery 10 based on the battery input power limit value $W_{in}(t)$ which is obtained every 100 msec, for example.

The input-enabled current value calculation unit 42, by using a battery current value IB(t) (which will hereinafter be also referred to as "IB[t]") and a battery temperature value TB(t) at time t (which will hereinafter be also referred to as "TB[t]"), which are output from the battery ECU 22 and temporarily stored in the RAM 36 of the HVECU 30, and a charge capacity value SOC (t) at time t which is estimated by the SOC estimation unit 24, and based on the program stored in the ROM 34 of the HVECU 30, obtains an input-enabled current value reduction amount F or f per unit time during charge, or an input-enabled current value recovery amount F' or f' (corresponding to F of the following formula (I') and f of the following formula (II')) per unit time during discharge and also obtains an enabled current amount recovery amount G or g per unit time when the battery is left uncontrolled, and further calculates the input-enabled current value $I_{lim}(t)$ based on these values. Here, while the input-enabled current value is calculated based on the previously-calculated input-enabled current value $I_{lim}(t-1)$, an only initially set input-enabled current value $I_{lim}(0)$ is used for the initial time. This "only initially set input-enabled current value $I_{lim}(0)$" is obtained as a maximum current value at which Li metal does not precipitate within the unit time when being charged from a state free from effects of the charge/discharge history.

In the present embodiment, during charge, the input-enabled current value calculation unit 42 calculates the input-enabled current value $I_{lim}(t)$ (which will be also referred to as $I_{lim}[T]$, $I_{lim}[t]$) by using the following formula. First, when there is no charge/discharge history; i.e., only at the initial time, the input-enabled current value $I_{lim}(t)$ is obtained by the following formula (I). Specifically, a reduction amount or a recovery amount F, F' due to continuous charge/discharge and a recovery amount G when being left uncontrolled are subtracted from the input-enabled current value $I_{lim}(0)$ in a state free from charge/discharge history.

[Mathematical Formula 1]

$$I_{lim}[T] = I_{lim}[0] - \int_0^T F(IB[t], TB[t], SOC[t])dt - \int_0^T G(t, TB[t], SOC[t])dt \quad (\text{I})$$

wherein $I_{lim}[0] \leq I_{lim}[T] < 0$

In Formula (I), the following are defined:
[Mathematical Formula 2]

$I_{lim}[0]$: maximum current value at which Li metal does not precipitate within the unit time when being charged from a state without effects of charge/discharge history.

$\int_0^T F(IB[t], TB[t], SOC[t])dt$: enabled current value reduction term due to continuous charge from a state without history to time T (which will be a recovery term during discharge because the value is positive)

$\int_0^T G(t, TB[t], SOC[t])dt$: recovery term due to time

Further, during charge, if there is a charge/discharge history, the input-enabled current value $I_{lim}(t)$ is obtained by the following formula (II).

[mathematical formula 3]

$$I_{lim}[t] = I_{lim}[t-1] - f(IB[t], TB[t], SOC[t]) \times dt - g(TB[t], SOC[t]) \times \frac{I_{lim}[0] - I_{lim}[t-1]}{I_{lim}[0]} \times dt \quad (\text{II})$$

In the above formula, $I_{lim}[T]$ and $I_{lim}[t]$ represent input-enabled current values at time T and t; IB[t] represents a battery current value at time t; TB[t] represents a battery temperature value at time t; SOC[t] represents a battery SOC value at time t; f( ) function represents an enabled current reduction term per unit time by means of charge; and g( ) function represents an enabled current recovery term per unit time by being left uncontrolled.

Figure 4:
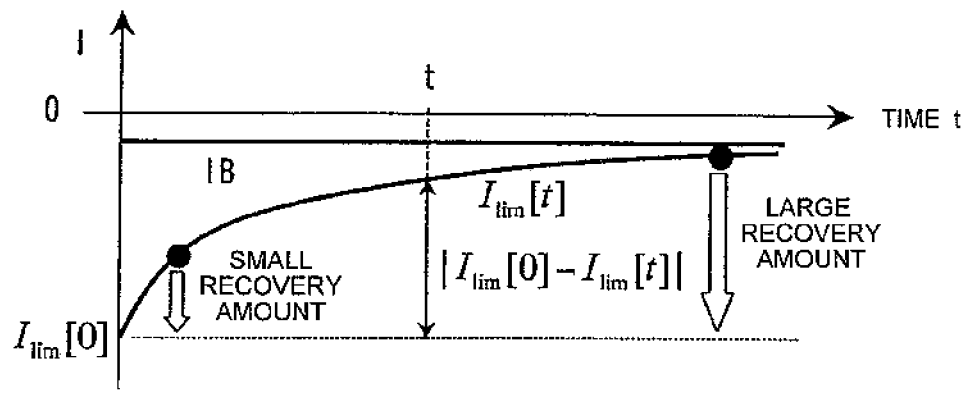
FIG. 4 is a view for explaining a current recovery amount obtained when a secondary battery is left uncontrolled, for calculating an input-enabled current value.

When $I_{lim}[t]=0$, which indicates that Li ions in the negative electrode active material of the secondary battery are in a saturated state, $I_{lim}[0] - I_{lim}[t]$ represents an Li ion amount in the negative electrode active material of the secondary battery. Meanwhile, as illustrated in FIG. 4, the input-enabled current value recovery amount with time can be obtained by reduction of Li ions in the negative electrode active material and is proportional to the amount of Li ions. Accordingly, the relationship of $I_{lim}[t-1]$ at time (t-1) a unit time (dt) before the present time is proportional to a difference between $I_{lim}[0]$ and $I_{lim}[t-1]$, and can be obtained by dividing by $I_{lim}[0]$ in order to make the difference dimensionless.

Meanwhile, during discharge, in the above formulas (I) and (II), the signs in the function of F and the function of f are changed from negative to positive as follows:

[mathematical formula 4]

$$I_{lim}[T] = I_{lim}[0] + \int_0^T F(IB[t], TB[t], SOC[t])dt - \int_0^T G(t, TB[t], SOC[t])dt \quad (\text{I'})$$

wherein $I_{lim}[0] \leq I_{lim}[T] < 0$

[mathematical formula 5]

$$I_{lim}[t] = I_{lim}[t-1] + f(IB[t], TB[t], SOC[t]) \times dt - g(TB[t], SOC[t]) \times \frac{I_{lim}[0] - I_{lim}[t-1]}{I_{lim}[0]} \times dt \quad (\text{II'})$$

In the above formulas, F( ) function and f( ) function represent an enabled current recovery term per unit time by discharge. All other conditions are the same as in Formulas (I) and (II) and will therefore not be described.

Further, in the present embodiment, in consideration of reduction in performance with use and in order to suppress the Li metal precipitation with time, the input-enabled current value calculation unit 42 multiplies $I_{lim}[T]$ and $I_{lim}[t]$ obtained by the above formulas by a degradation coefficient η to obtain $I_{lim}'[T]$ and $I_{lim}'[t]$ which consider degradation of the secondary battery with time.

[Mathematical Formula 6]

$$I_{lim}'[T] = I_{lim}[T] \times \eta, \text{ or } I_{lim}'[t] = I_{lim}[t] \times \eta \quad (\text{III})$$

In the above formula, η represents a degradation coefficient.

The degradation coefficient η described above may be a fixed value, or a plurality of degradation coefficients η may be obtained based on a map formed of a relationship between the charge/discharge frequency and the degradation coefficient of the secondary battery prestored in the RAM 36 of the HVECU 30.

Further, the input power limit value calculation unit 44 calculates a battery input limit value $W_{in}(t)$ in order to prevent the battery current value IB from exceeding $I_{lim}'(t)$ due to control delay of feedback control and so on. More specifically, the input power limit value calculation unit 44 temporarily calculates an input current limit target value $I_{tag}$, based on the battery current value IBM at time t which is output from the battery ECU 22 and temporarily stored in the RAM 36 of the HVECU 30 and the enabled input current value $I_{lim}'(t)$ calculated by the enabled-input current value calculation unit 42, such that a predetermined amount is offset from $I_{lim}(t)$, for example (see FIG. 5). Then, based on $I_{tag}$ thus obtained, the battery input limit value $W_{in}(t)$ is calculated by the following Formula (IV).

Figure 5:
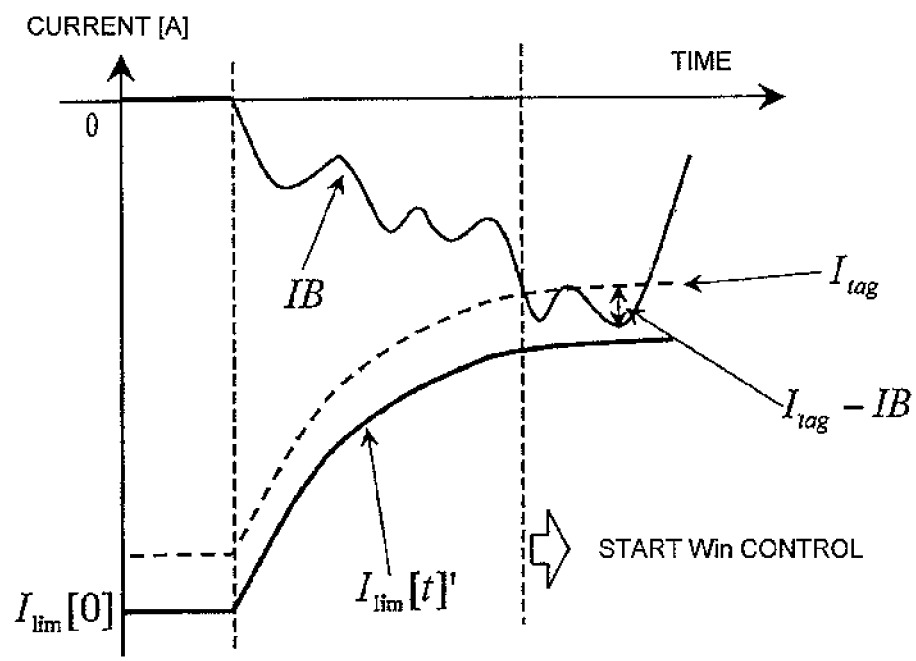
FIG. 5 is a view for explaining a structure of a formula (IV) for obtaining an input power limit value of the present invention.

As illustrated in FIG. 5, the input power limit value calculation unit 44 controls charge by means of the input power limit value $W_{in}(t)$ obtained from Formula (IV) to suppress the charge current IB below $I_{lim}'(t)$, so that precipitation of Li metal on the negative electrode can be reduced.

[Mathematical Formula 7]

$$W_{in}(t) = SW_{in}(t) - K_p \times \{IB(t) - I_{tag1}(t)\} - K_i \times \int \{IB(t) - I_{tag2}(t)\}dt \quad (\text{IV})$$

In the above formula, $W_{in}(t)$ represents a battery input power limit value (W) at time t; $SW_{in}(t)$ represents a predetermined battery input power limit prescribed value (e.g. base input power limit prescribed value of the battery determined from the battery temperature); $K_p$ represents p-term feedback gain; $K_i$ represents i-term feedback gain; $I_{tag1}(t)$ represents a current limit target value by p-term feedback control; $I_{tag2}(t)$ represents a current limit target value by i-term feedback control; and IB(t) represents a battery current value at time t. Further, $SW_{in}(t)$ can be obtained, for example, by a map of a relationship between the battery temperature and so on and the input power limit prescribed value, which is previously set.

Further, the above $I_{tag1}(t)$ and $I_{tag2}(t)$ can be obtained by the following Formula (V).

[Mathematical Formula 8]

$$I_{tag1}(t)=F_p(I_{lim}'(t)), \text{ and } I_{tag2}(t)=F_i(I_{lim}'(t)) \quad (V)$$

In the above Formula (V), $I_{tag1}(t)$ and $I_{tag2}(t)$ are obtained as amounts which are offset from $I_{lim}'(t)$ by predetermined respective amounts, as described above. Accordingly, it is possible to prestore, as a map, the relationship between $I_{tag1}(t)$ and $I_{tag2}(t)$ and $I_{lim}'(t)$ in the RAM 36 of the HVECU 30 and obtain $I_{tag1}(t)$ and $I_{tag2}(t)$ with reference to the map. It is further possible to suppress the Li metal precipitation caused by a reduction of the negative electrode potential, by preparing a map in consideration of degradation of the secondary battery and control of the secondary battery.

Further, in order to suppress reduction in performance due to use of the battery, the battery charge/discharge control device 20 according to the present embodiment may further include an upper limit voltage control unit for controlling the upper limit voltage of the lithium ion secondary battery to remain below a predetermined upper limit voltage. The upper limit voltage control unit compares, in the HVECU 30, for example, the predetermined upper limit voltage value with an actual battery voltage value which is output from a voltage sensor which is not shown, thereby controlling the amount of charge. As such, by setting the upper limit value of the charge voltage, it is possible to prevent application of an unnecessarily large voltage to the cell.

The structure of a hybrid vehicle including the battery charge/discharge control device 20 according to the present embodiment described above will be now described with reference to FIG. 1. Here, while the "hybrid vehicle" as used in the present specification refers to a hybrid vehicle (HV) in which both an engine which outputs power for power generation and a motor for traveling are mounted, a so-called electric vehicle (EV) and a so-called fuel cell electric vehicle (FCEV) are also included.

As illustrated in FIG. 1, the hybrid vehicle (HV) 100 includes the temperature sensor 12, the current sensor 14, and the battery charge/discharge control device 20. The HV 100 further includes the engine 58, a three-axis type power distribution/integration mechanism 56 connected to an output shaft of the engine 58, the motor 52 which is connected to the power distribution/integration mechanism 56 for driving drive wheels 60 and generating power, a generator 54 which is connected to the power distribution/integration mechanism 56 for generating power, the battery 10 formed of a chargeable/dischargeable lithium ion secondary battery which supplies electric power to the motor 52 and performs electric power storage by generated power and regenerative energy from the generator 54, and a booster converter also functioning as an inverter 50 (booster converter/inverter 50) which connects the battery 10 to the motor 52 and the generator 54 and also receives a torque instruction from the motor ECU 28. Here, the motor 52 transmits and receives electric power with respect to the battery 10 via the booster converter/inverter 50. Further, the motor ECU 28 is in communication with the HVECU 30, and controls the booster converter/inverter 50 in accordance with a control signal from the HVECU 30 to drive control the motor 52 and also outputs data concerning the operation state of the motor 52 to the HVECU 30 as necessary. Here, the booster converter controls an inverter input voltage, and controls the inverter input voltage in accordance with the output torque of the motor 52. The inverter controls driving current to the motor 52 and also controls regenerative braking. The electric power generated by the generator 54 is supplied to the battery 10 via the booster converter/inverter 50. Further, the motor 52 and the generator 54 are not necessarily provided individually.

Further, the structure of the hybrid vehicle 100 will be described in detail below. The engine 58 is an internal combustion engine which outputs driving power by means of supply of hydrocarbon fuel such as gasoline and light oil, and is subjected to operation control such as fuel injection control, ignition control, suction air quantity adjustment control, and so on, performed by the engine ECU 26 to which signals from various sensors for detecting the operation state of the engine 58 are input. The engine ECU 26 communicates with the HVECU 30 to perform the operation control of the engine 58 based on the control signals supplied thereto from the HVECU 30 and also outputs data concerning the operation state of the engine 58 to the HVECU 30 as necessary.

Figure 6:
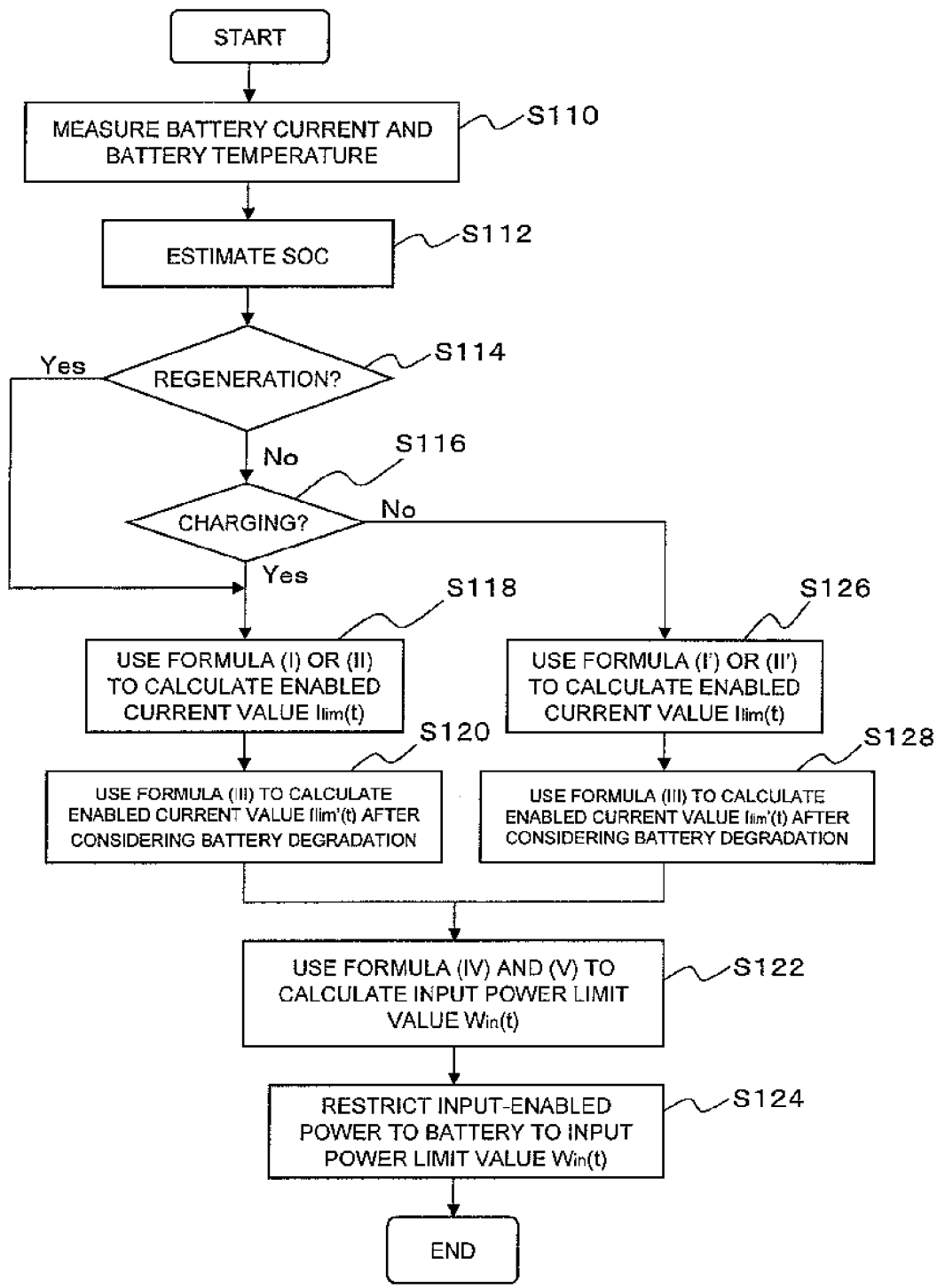
FIG. 6 is a flowchart for explaining battery charge/discharge control according to one embodiment of the present invention.

The operation of battery charge/discharge control in the hybrid vehicle 100 having the battery charge/discharge control device 20 according to the present embodiment will be described with reference to FIGS. 1 and 6. First, the temperature sensor 12 measures a battery temperature at time t and the current sensor 14 measures a battery current at time t (S110). The battery ECU 22 stores the battery temperature value at time t which is output from the temperature sensor 12 and the battery current value at time t which is output from the current sensor 14, and outputs the battery temperature value and the battery current value at time t to the SOC estimation unit 24 and also outputs the battery temperature value and the battery current value at time t to the HVECU 30. The RAM 36 of the HVECU 30 temporarily stores the battery temperature value and the battery current value at time t which are input thereto. The SOC estimation unit 24, based on the battery temperature value and the battery current value at time t which are input, estimates the charge capacity SOC (t) at time t (S112).

Next, if the HVECU 30 determines a regeneration state based on the accelerator opening degree, the brake pedal depression amount, the vehicle speed, and so on (S114), charging for storing electric power by means of regenerative energy is started, and the input-enabled current value calculation unit 42 calculates an input-enabled current value $I_{lim}(t)$ by using Formulas (I) and (II) described above (S118), and also calculates an input-enabled current value $I_{lim}'(t)$ which considers degradation of the secondary battery with time, by using Formula (III) (S120).

Further, based on the input-enabled current value $I_{lim}(t)$ output from the input-enabled current value calculation unit 42 and an actual battery current value IB at time t, the input power limit value calculation unit 44 calculates an input power limit value $W_{in}(t)$ by using Formulas (IV) and (V) described above (S122). In other words, the amount of reduction in the input-enabled current limit $I_{lim}(t)$ due to continuous charge (the reduction amount due to F term) is updated. Then, the input power to the battery 10 is limited to the input power limit value $W_{in}(t)$ (S124). Specifically, the HVECU 30 determines a motor torque instruction to control the booster converter/inverter 50 via the motor ECU 28, and at this time, adjusts the motor torque instruction (a negative torque instruction for charging) such that the input power to the battery 10 is $W_{in}(t)$ or less.

Also, when, while the battery 10 is not in the regeneration state, a request for charge is generated based on the SOC of the battery 10, the operations from S118 to S124 are similarly performed as described above. In this case, in general, the electric power generated by the generator 54 is supplied to the battery 10.

Further, when the battery 10 is not in the regeneration state, and is not being charged at the time of travelling, the input-enabled current value calculation unit 42 calculates an input-enabled current value $I_{lim}'(t)$ by using the Formulas (I') and (II') described above (S126), and also calculates an input-enabled current value $I_{lim}'(t)$ which considers degradation of the secondary battery with time, by using Formula (III) (S128). In other words, the recovery amount of the input-enabled current value $I_{lim}(t)$ due to continuous discharge (the recovery amount due to F term) or an increased amount due to being left uncontrolled (the recovery amount due to G term) is updated.

Further, based on the input-enabled current value $I_{lim}'(t)$ output from the input-enabled current value calculation unit 42, which has been updated concerning the discharge or uncontrolled state, the input power limit value calculation unit 44 calculates an input power limit value $W_{in}(t)$, by using Formulas (IV) and (V) (S122). In addition, the input power limit value calculation unit 44 limits the input-enabled power to the battery 10 based on the input power limit value $W_{in}(t)$ which is calculated (S124). Here, when the battery is discharged or left uncontrolled, as charge of the battery is not performed, only the input power limit value $W_{in}(t)$ is updated, and driving (output torque) control of the motor is performed without regard to the input power limit value $W_{in}(t)$.

With the control described above, the input power to the battery 10 is input power obtained by applying feedback control in accordance with the battery current IB to the base power value $SW_{in}(t)$ of the input power limit specified value. In the feedback control, $I_{tag1}(t)$ or $I_{tag2}(t)$ is obtained by adding a predetermined offset (control margin) to the input-enabled current value $I_{lim}(t)$ which aims to prevent precipitation of metal lithium or to $I_{lim}'(t)$ which further considers battery degradation with respect to $I_{lim}(t)$, and it is possible to effectively prevent the battery current IB from exceeding $I_{tag1}(t)$ or $I_{tag2}(t)$. Further, $I_{tag1}(t)$ (or $I_{tag2}(t)$) also considers the history of charge/discharge. More specifically, as indicated by Formulas (I), (II), (I'), (II'), and (III), $I_{tag1}(t)$ (or $I_{tag2}(t)$) considers reduction or recovery of the input-enabled current based on the charge/discharge continuation time, and recovery of the input-enabled current due to being left uncontrolled. It is therefore possible to achieve prevention of metal lithium precipitation in accordance with the state of the battery 10 at that time.

[Feedforward Control]

Figure 7:
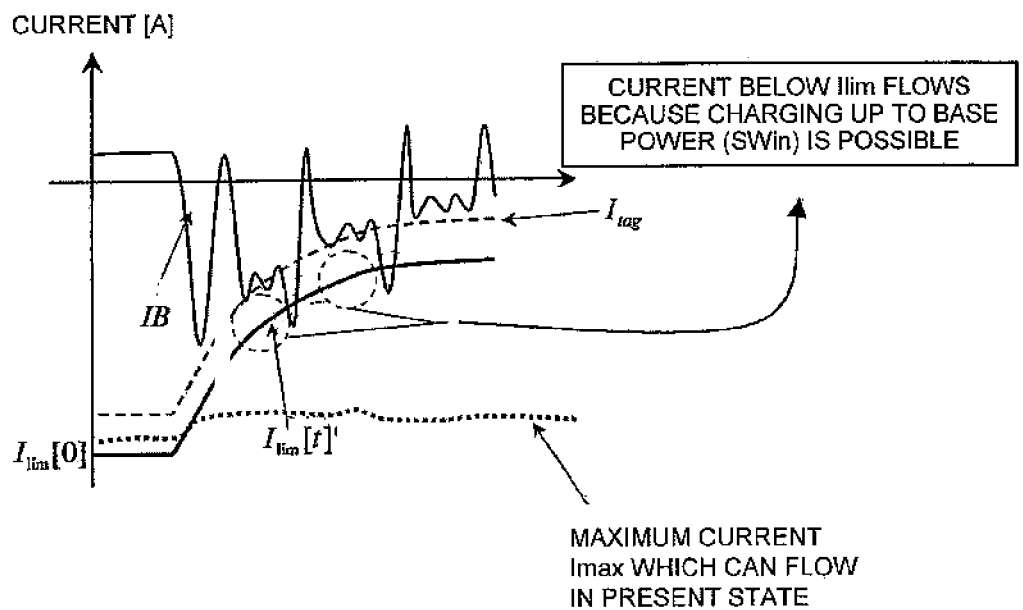
FIG. 7 is a view for explaining a structure in which feedforward control is performed to obtain an input power limit value using $I_{tag}$ in the present invention.

Here, as illustrated in FIG. 7, when the fluctuation of the charge/discharge current to the battery 10 is large even if the HVECU 30 controls the booster converter/inverter 50 via the motor ECU 28 based on the battery input power limit value $W_{in}(t)$ for feedback described above, to adjust the input-enabled power to the battery 10, the input-enabled power cannot be adjusted sufficiently and may be equal to or below the input-enabled current value $I_{lim}(t)$ or $I_{lim}'(t)$ (see portions of FIG. 7 encircled by dotted lines).

Accordingly, in the battery charge/discharge control device 20 according to the present embodiment illustrated in FIG. 1, the input-enabled power adjustment unit 40 further includes a feedforward control battery input power limit value calculation unit 46. This feedforward control battery input power limit value calculation unit 46 changes the target input power limit value $SW_{in}(t)$ to a base power $W_{in\text{-}nb}(t)$ which is based on the feedforward control.

More specifically, with $W_{in\text{-}nb}(t)$, which is battery input power in the case in which the input current limit target value $I_{tag}(t)$ described above is a battery current, being set as a target input power, feedback control based on the battery current IB at that time is performed. With this control, it is possible to effectively prevent the absolute value of the battery current IB from exceeding the absolute value of the input-enabled current value $I_{lim}(t)$ or $I_{lim}'(t)$.

Figure 8:
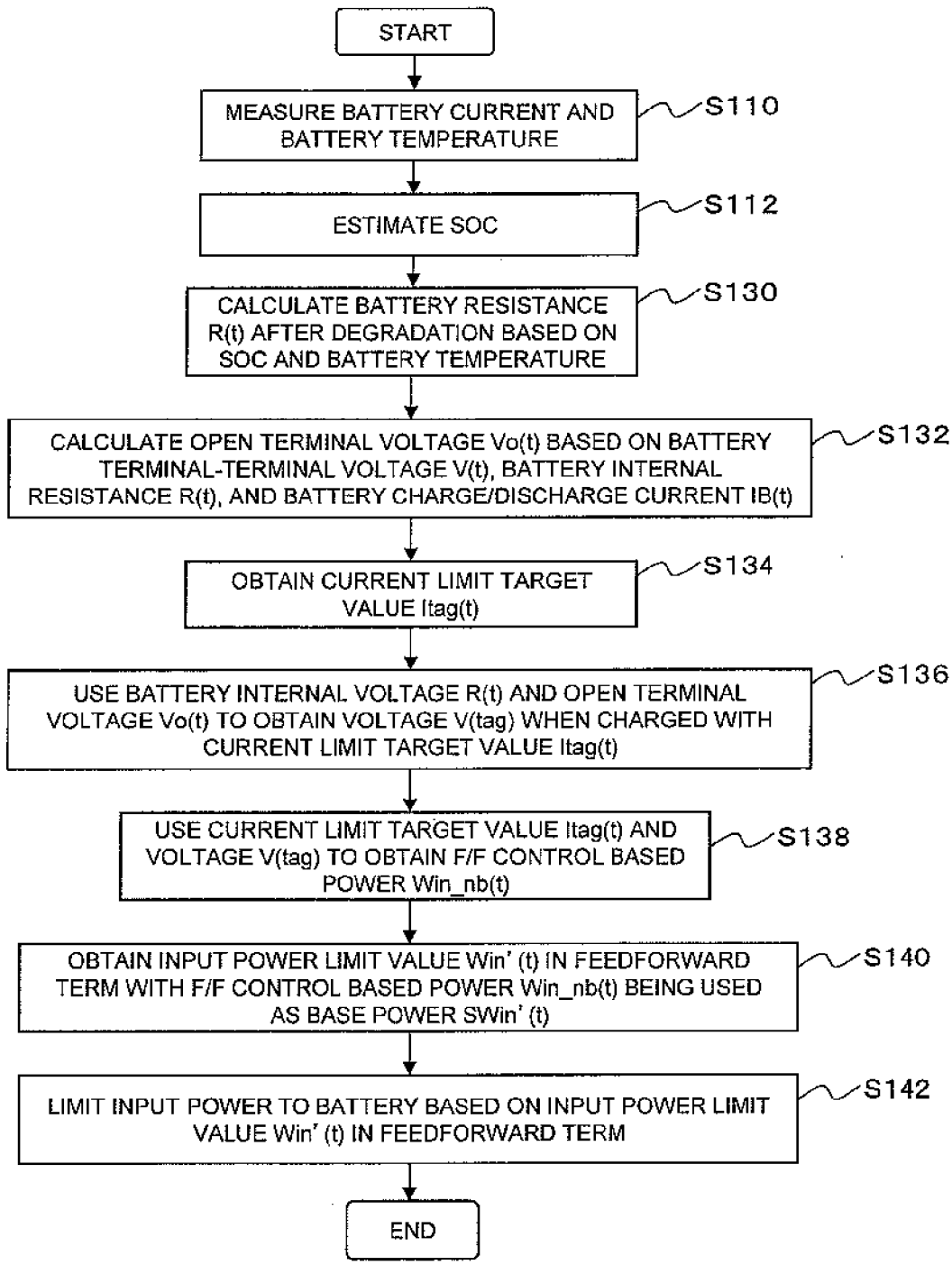
FIG. 8 is a flowchart for explaining battery charge/discharge control according to another embodiment of the present invention.

The battery charge/discharge control device 20 according to the present embodiment further includes a voltage sensor 16 for measuring a terminal-to-terminal voltage of the battery 10, as illustrated in FIG. 1. The battery charge/discharge control operation in the battery charge/discharge control device 20 by using the feedforward control battery input power limit value calculation unit 46 will be described with reference to FIGS. 1 and 8.

First, the temperature sensor 12 measures the battery temperature at time t, and the current sensor 14 measures the battery current IB(t) at time t (S110). The battery ECU 22 stores the battery temperature value at time t output from the temperature sensor 12 and the battery current value IB(t) at time t output from the current sensor 14, and also outputs the battery temperature value and the battery current value at time t to the SOC estimation unit 24, and further outputs the battery temperature value and the battery current value at time t to the HVECU 30. The RAM 36 of the HVECU 30 temporarily stores the battery temperature value and the battery current value at time t which are input thereto. The SOC estimation unit 24 estimates a charge capacity SOC(t) at time t, based on the battery temperature value and the battery current value at time t which are input thereto (step S112). Further, the voltage sensor 16 measures the battery terminal-to-terminal voltage V(t) at time t, and the battery ECU 22 stores the battery terminal-to-terminal voltage V(t) at time t, output from the voltage sensor 16. Further, the feedforward control battery input power limit value calculation unit 46 obtains, based on the battery temperature value at time t which is stored in the battery ECU 22, a battery internal resistance R(t) at time t at intervals of 200 msec, for example (S130), and also calculates an open terminal voltage Vo(t) based on the battery terminal-to-terminal voltage V(t) and the battery current IB(t) at time t, which are stored in the battery ECU 22, by using the following Formula (VI) (S132).

[Mathematical Formula 9]

$$V(t)=Vo(t)-IB(t)\times R(t) \quad (VI)$$

Next, the feedforward control battery input power limit value calculation unit 46 obtains the input current limit target value $I_{tag}(t)$ by using the above Formula (V) (S134). Here, the input current limit target value $I_{tag}(t)$ includes the above-described $I_{tag1}(t)$ and $I_{tag2}(t)$. Then, the voltage $V_{tag}(t)$ obtained when the input current limit target value $I_{tag}(t)$ is the maximum charge current is obtained based on the following formula (S136).

[Mathematical Formula 10]

$$V_{tag}(t)=Vo(t)-R(t)\times I_{tag}(t) \quad (VII)$$

Further, the feedforward control battery input power limit value calculation unit 46 obtains the feedforward control base power $W_{in-nb}(t)$ based on the current limit target value $I_{tag}(t)$ and the voltage $V_{tag}(t)$ by using the following formula (S138). In the specification and the drawings of the present application, the "feedforward control" is described in an abbreviated form of "F/F control."

[Mathematical Formula 11]

$$W_{in-nb}(t) = V_{tag}(t) \times I_{tag}(t) \qquad \text{(VIII)}$$

Next, the input power limit value $W_{in}'(t)$ which reflects a feedforward term is obtained by using the following Formula (IX) in which the base power $SW_{in}(t)$ in Formula (IV) used in the feedback control described above is replaced with the feedforward control base power $W_{in-nb}(t)$ (which will be hereinafter referred to as "$SW_{in}'(t)$") (S140).

[Mathematical Formula 12]

$$W_{in}'(t) = W_{in-nb} - K_p \times \{IB(t) - I_{tag1}(t)\} - K_i \times \int \{IB(t) - I_{tag2}(t)\} dt \qquad \text{(IX)}$$

In the above formula, $W_{in}'(t)$ represents a battery input power limit value (W) due to feedforward control at time t; $W_{in-nb}(t)$ represents a base power value at time t; $K_p$ represents p-term feedback gain; $K_i$ represents i-term feedback gain; $I_{tag1}(t)$ represents a current limit target value by p-term feedback control; $I_{tag2}(t)$ represents a current limit target value by i-term feedback control; and IB(t) represents a battery current value at time t.

Further, based on the input power limit value $W_{in}'(t)$ of the feedforward term which is calculated, the HVECU 30 determines the motor torque instruction and controls the booster converter/inverter 50 via the motor ECU 28 (S142). At this time, the HVECU 30 adjusts the motor torque instruction (a negative torque instruction for charging) such that the input power to the battery 10 is $W_{in}'(t)$ or less.

In the battery input power limitation in which the base voltage $SW_{in}(t)$ that is a battery input power limit prescribed value, calculated from the temperature and so on, is a target value, when a fluctuation of the charge current (battery current IB) is large, the charge current exceeds the input-enabled current value $I_{lim}(t)$ or $I_{lim}'(t)$, causing problems including Li precipitation. According to the present embodiment, however, with the feedforward control base power $W_{in-nb}(t)$, which is calculated from the current limit target value $I_{tag}(t)$ obtained by offsetting the input-enabled current value $I_{lim}(t)$ or $I_{lim}'(t)$ with which the problems including Li precipitation can be avoided, by a predetermined amount, being set as a target value (of the charge current), the input power limit value $W_{in}'(t)$ is subjected to feedback control in accordance with a difference between the battery current IB and the current limit target value. (In other words, "the battery input power" is limited). Here, in order to suppress excess of the charge current in the feedback control, increasing the feedback gain sufficiently can be considered. However, if the feedback gain is increased excessively, there is a possibility that the control stability is impaired and drivability as a vehicle is lost. Also, even when the feedback gain is increased, there is also a possibility that the charge current exceeds the current limit target value $I_{tag}(t)$ when the fluctuation of the charge current is large. Accordingly, in the present embodiment, in addition to or prior to the feedback control described above, the feedforward control base power $W_{in-nb}(t)$, which is calculated based on the input current limit target value $I_{tag}(t)$ which is the maximum current of the assumed charged current and the voltage $V_{tag}(t)$ obtained when charged with the maximum current, is replaced with the battery input power limit prescribed value $SW_{in}'(t)$ which is calculated from the temperature, so that control is performed with the target value for control being limited to the battery input power limit prescribed value $SW_{in}'(t)$. Accordingly, the input current limit target value $I_{tag}(t)$ described above is a current value which is greater (having a smaller absolute value) than the input-enabled current value $I_{lim}(t)$ or $I_{lim}'(t)$ to the battery, and by charging the battery with the base power $SW_{in}'(t)$ obtained as described above being a target value, it is possible to effectively prevent precipitation of the lithium metal in the negative electrode of the battery.

[Degradation Coefficient η]

Figure 9:
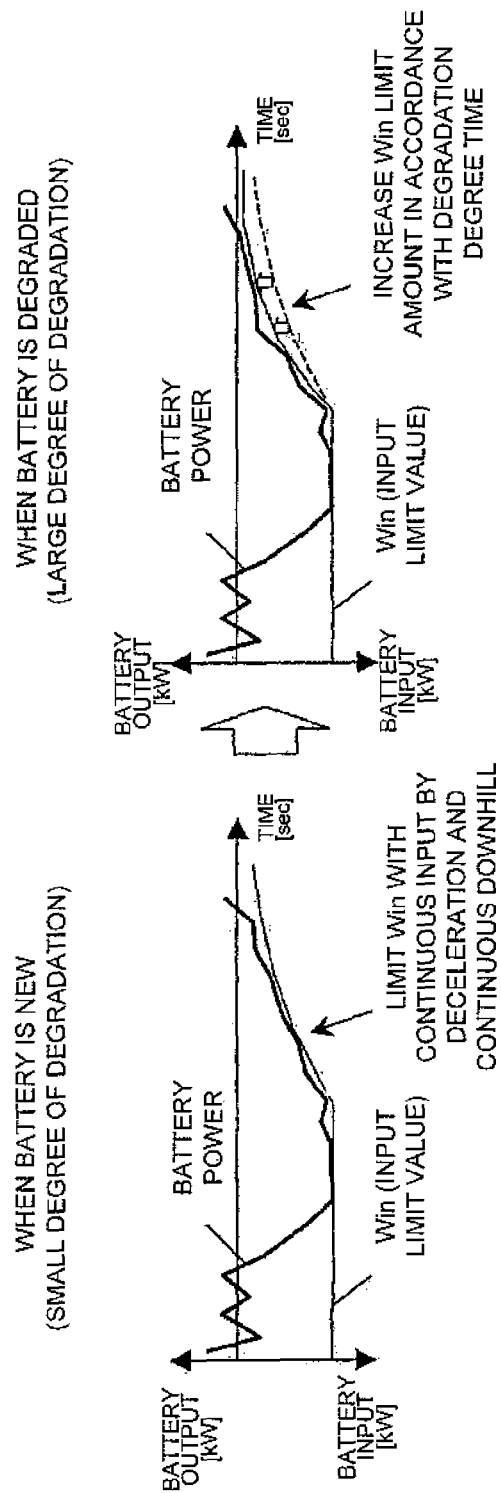
FIG. 9 is a view for explaining input power limit with respect to the degree of degradation of a lithium ion secondary battery.

As described above, the input-enabled current value calculation unit 42 illustrated in FIG. 1 multiplies $I_{lim}[T]$ and $I_{lim}[t]$ obtained by Formulas (I), (II), (I'), and (II') by the degradation coefficient η in the above Formula (III), to thereby obtain $I_{lim}'[T]$ and $I_{lim}'[t]$ which consider degradation of the secondary battery with time. Here, the degree of degradation of the batteries such as lithium ion batteries changes with use over time. It is therefore preferable to change the control amount of $W_{in}$ described above in accordance with the degree of degradation as illustrated in FIG. 9, in order to suppress precipitation of lithium metal, while maximally utilizing the input and output of the lithium ion secondary battery.

According to the present embodiment, the degradation parameter D is obtained based on the battery degradation degree calculation methods described below, and the degradation coefficient η is then obtained in accordance with the degradation parameter D by using a map prestored in the ROM 34 of the HVECU 30. Then, $I_{lim}'[T]$ and $I_{lim}'[t]$ which consider degradation of the secondary battery with time are obtained by using the degradation coefficient η which is obtained, thereby considering the age degradation of the battery. More specifically, in the case of a new battery with a small degree of degradation, the degree of increase in the battery input power limit value $W_{in}$ in the case of continuous charge can be approximately that illustrated in the chart located on the left side of FIG. 9, whereas in the case of a battery with a large degree of degradation, it is desirable to set the battery input power limit value $W_{in}$ to a value close to 0 to thereby limit the charge current to a smaller value as illustrated in the chart located on the right side of FIG. 9. In the battery degradation degree calculation methods described below, the period of use is counted in a cumulative manner by a timer 38 of the HVECU 30 from the time when the battery 10 is mounted. However, in consideration of replacement of components and from the view point of sharing timer information, it is also possible to count the period of use in a cumulative manner from the time when the battery 10 is mounted, by means of timers provided in the battery ECU 22 and the engine ECU 26, and it is also preferable to count the period of use at a plurality of locations, for example.

[Battery Degradation Degree Calculation Method]

Three example battery degradation degree calculation methods will be described with reference to FIG. 1, and FIGS. 10 to 17.

(i) Battery Degradation Degree Calculation Method from Electromotive Voltage

Figure 10:
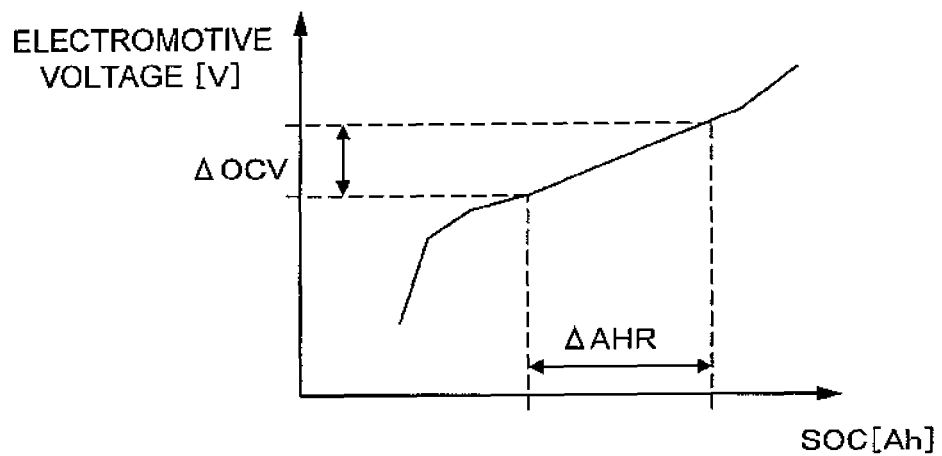
FIG. 10 is a view for illustrating one example relationship between the current summation value (SOC[Ah]) and the electromotive voltage [V] due to discharge when the use period of a lithium ion secondary battery is 0 years.
Figure 11:
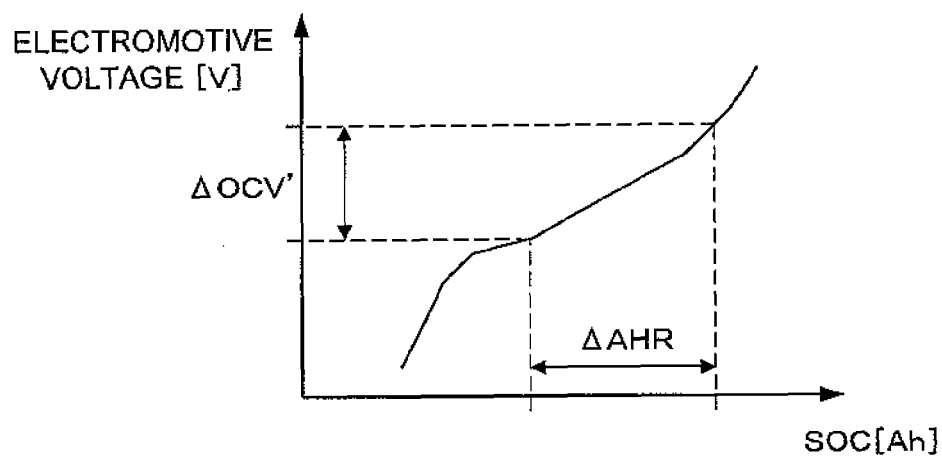
FIG. 11 is a view for illustrating one example relationship between the current summation value (SOC[Ah]) and the electromotive voltage [V] due to charge/discharge when the use period of a lithium ion secondary battery is 15 years.

FIG. 10 illustrates an example relationship between the current summation value due to discharge (SOC[Ah]) and the electromotive voltage [V] in the case of a new battery; i.e., when the period of use of the battery is 0 years, and FIG. 11 illustrates an example relationship between the current summation value due to charge and discharge (SOC[Ah]) and the electromotive voltage [V] when the period of use of the battery is 15 years. In the present embodiment, as the above-described electromotive force, there is used a voltage value obtained by subtracting a voltage change amount generated by internal resistance and polarization from the battery voltage under no-load condition or the battery voltage under a loaded condition. Further, the electromotive voltage is obtained by the battery ECU 22, and the current summation value due to charge and discharge is obtained by the SOC estimation unit 24.

Figure 12:
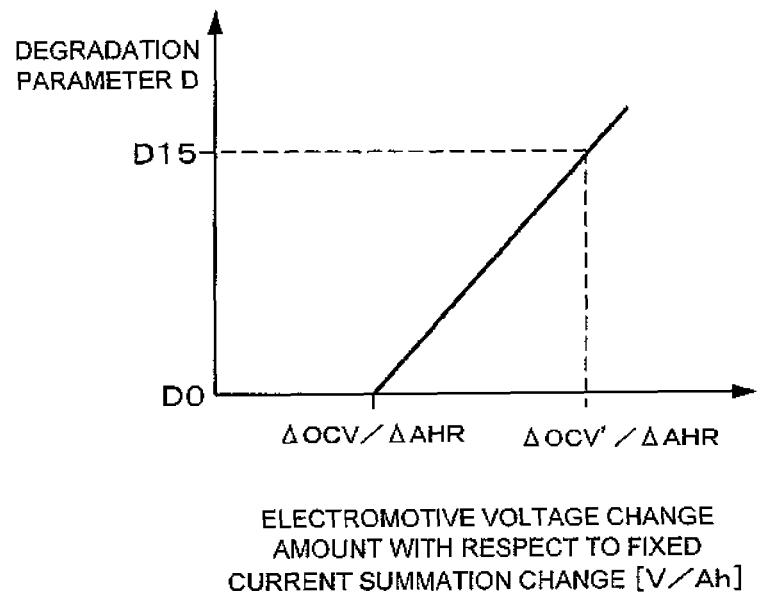
FIG. 12 is a view for explaining standardization of the degradation degree parameter D based on an electromotive voltage change amount with respect to a change of the fixed current summation corresponding to the use period of the lithium ion secondary battery.

As illustrated in FIGS. 10 and 11, the electromotive voltage change ΔOCV and the electromotive voltage change ΔOCV' with respect to the same current summation change ΔAHR of the current summation value (SOC[Ah]) due to charge and discharge differ from each other depending on the battery degradation (i.e. the change of the electromotive voltage with respect to the SOC change increases with degradation of the battery). Accordingly, the battery degradation degree is calculated by using the battery use period output from the timer 38 of the HVECU 30, the electromotive voltage obtained by the battery ECU 22, and the current summation value due to charge and discharge which is obtained by the SOC estimation unit 24. Specifically, the input-enabled current value calculation unit 42 is set such that if the period of use exceeds a predetermined number of years (e.g. 10 years), the battery degradation degree sequentially increases, as illustrated in FIG. 12. In the example illustrated in FIG. 12, based on the electromotive voltage change amount ΔOCV/ΔAHR with respect to the fixed current summation amount (fixed SOC change amount) when the period of use is 0 years and ΔOCV'/ΔAHR, which is the electromotive voltage change amount with respect to the fixed current summation amount when the period of use is 15 years, the degradation degree parameter D0 when the period of use is 0 years and the degradation degree parameter D15 when the period of use is 15 years are standardized, thereby calculating the battery degradation degree D.

(ii) Battery Degradation Degree Calculation Method from Internal Resistance

Figure 13:
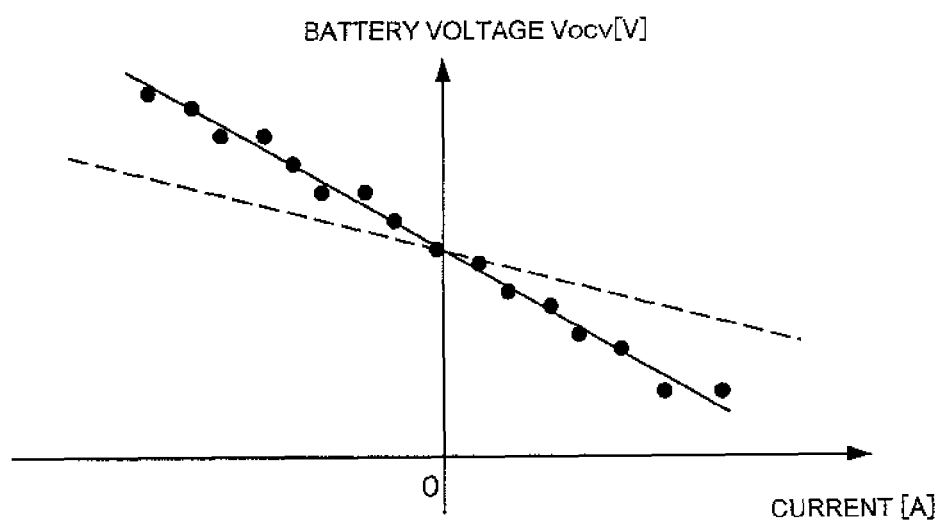
FIG. 13 is view illustrating an example in which a current and a voltage detected in synchronization during charge/discharge of the lithium ion secondary battery are plotted.

The input-enabled current value calculation unit 42 plots the current and the voltage which are detected by the current sensor 14 and the voltage sensor 16, respectively, in synchronization with each other during charge and discharge, as illustrated in FIG. 13, and calculates the internal resistance R of the battery from the slope of a straight line obtained by the method of least squares.

Figure 14:
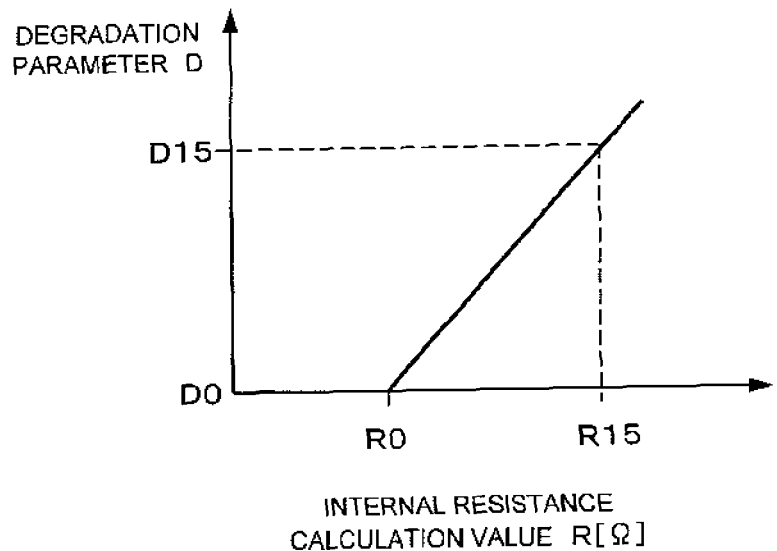
FIG. 14 is a view for explaining standardization of the degradation degree parameter D based on an internal resistance calculation value of the lithium ion secondary battery with respect to the use period of the lithium ion secondary battery.

Concerning the normal abrasion degradation of a battery, as there is a correlation between the increase in the internal resistance of the battery and the reduction in the battery capacity, a relationship represented by a formula of battery capacity degradation ΔCap=F (wherein the degree of increase of internal resistance ΔR) can be satisfied. Accordingly, the battery degradation degree is calculated by using the battery use period output from the timer 38 of the HVECU 30 and the battery internal resistance calculation value which is obtained. Specifically, in this example, the input-enabled current value calculation unit 42 is set such that if the period of use exceeds a predetermined number of years (e.g. 10 years), the battery degradation degree sequentially increases, as illustrated in FIG. 14. In the example illustrated in FIG. 14, based on the internal resistance R0 when the period of use is 0 years and the internal resistance R15 when the period of use is 15 years, the degradation degree parameter D0 when the period of use is 0 years and the degradation degree parameter D15 when the period of use is 15 years are standardized, thereby calculating the battery degradation degree D.

(ii) Battery Degradation Degree Calculation Method from Full-Charge Capacity

Figure 15:
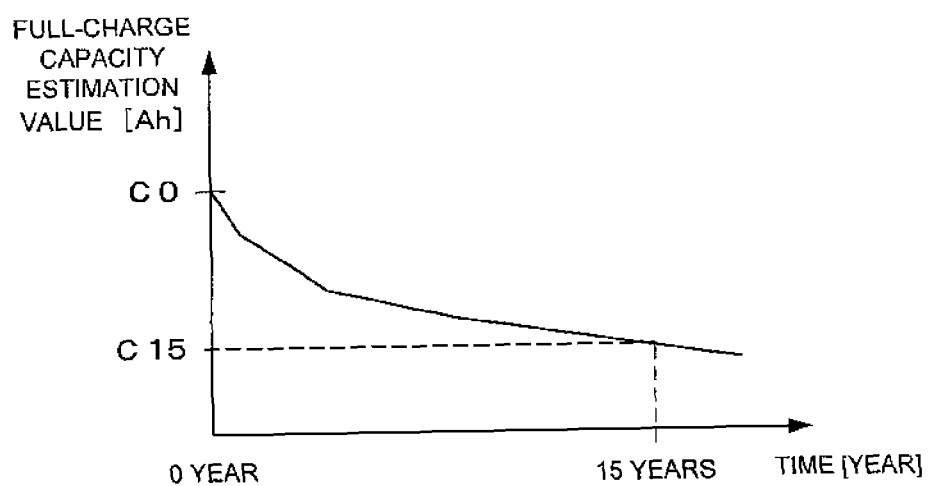
FIG. 15 is view illustrating an example in which a full-charge capacity estimation value and the use period of the lithium ion secondary battery are plotted.
Figure 16:
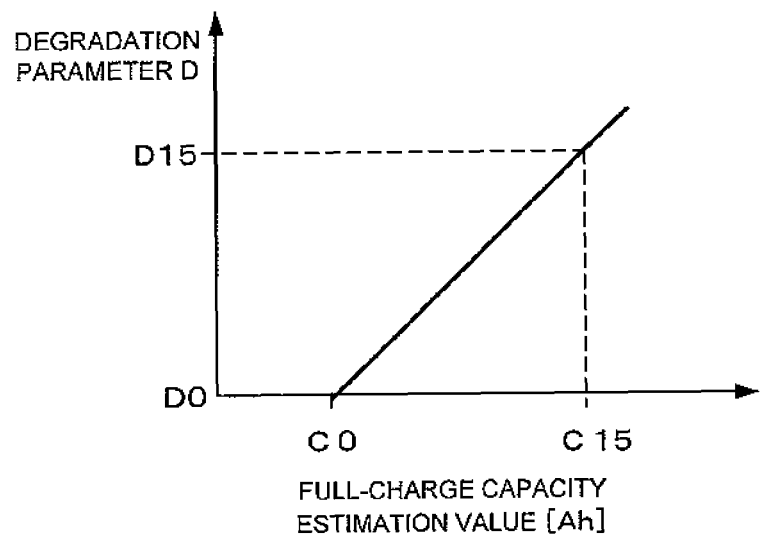
FIG. 16 is a view for explaining standardization of the degradation degree parameter D based on the full-charge capacity estimation value of the lithium ion secondary battery with respect to the use period of the lithium ion secondary battery.

As there is a correlation between the degradation of a battery and the reduction in the battery capacity, the input-enabled current value calculation unit 42 creates a map by plotting the full-charge capacity estimation value [Ah] estimated by the SOC estimation unit 24 and the battery use period output from the timer 38 of the HVECU 30 as illustrated in FIG. 15, thereby estimating the degree of degradation of capacity. Specifically, in this example, the input-enabled current value calculation unit 42 is set such that if the period of use exceeds a predetermined number of years (e.g. 10 years), the battery degradation degree sequentially increases, as illustrated in FIG. 16. In the example illustrated in FIG. 16, based on the full-charge capacity estimation value C0 when the period of use is 0 years and the full-charge capacity estimation value C15 when the period of use is 15 years, the degradation degree parameter D0 when the period of use is 0 years and the degradation degree parameter D15 when the period of use is 15 years are standardized, thereby calculating the battery degradation degree D.

Figure 17:
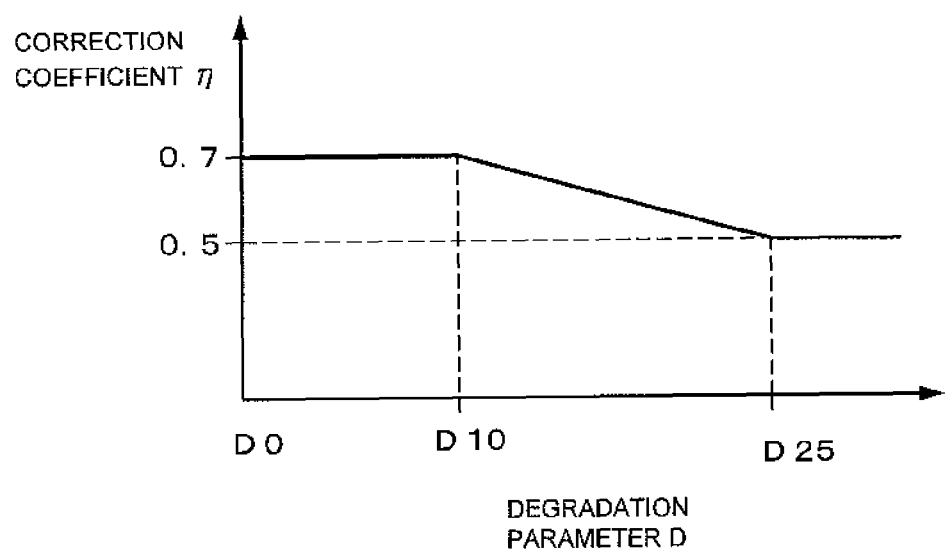
FIG. 17 is a view for explaining an example method of calculating the degradation parameter D based on the correction coefficient η.

Then, the input-enabled current value calculation unit 42 calculates the correction coefficient η, as illustrated in FIG. 17, by using the degradation parameter D which is obtained by at least one of the battery degradation degree calculation methods (i) to (iii) described above. In the present embodiment, as illustrated in FIG. 17, the degradation parameters D0 to D10 corresponding to the number of years of use, from 0 to 10 years, have the same value, for example. This is because a battery is used under the precondition that the constant functions of the battery can be maintained for the first ten years, for example, and stable control is performed with the use of the same degradation degree for batteries with the use period up to ten years. In this example, a fixed correction coefficient η=0.7 is used. Concerning batteries with the use period of ten or more years (e.g., from 10 years to 25 years as illustrated in FIG. 17), the correction coefficient η is appropriately changed as necessary from 0.7 to 0.5, for example, in accordance with the degree of degradation of the battery, and concerning batteries with the use period of twenty-five year or more, the correction coefficient η is limited to 0.5, for example, even with the progress of the battery degradation as illustrated in FIG. 17, in order to prevent failure of the battery charge/discharge control. In this case, however, it is desirable to take measures to prevent the use of a lithium ion secondary battery which has been used for more than twenty-five years, such as by separately an indicating message which encourages a user to replace the lithium ion secondary battery as a battery. It should be noted that the method illustrated in FIG. 17 is only one example, and it is also possible to calculate the correction coefficient η whenever necessary in accordance with the degradation parameter D. Here, it is preferable to determine the degradation parameter D as follows: the degradation parameters D0 to D10 are set to 1.0, and the degradation parameters beyond D10 are calculated by multiplying the correction coefficient η by D at that time which is obtained by D=1.0−((2/7)/15)×(number of years of use—10 years)). With this calculation, in the case of the battery with the use period of twenty-five years, D25=1−(2/7) is satisfied, and the correction coefficient η multiplied by the degradation parameter D is η=0.7−0.2=0.5. Actually, it is desirable to store, as a map, the degradation parameters D in accordance with the number of years of use. In addition, the correction coefficient η obtained by multiplication of D may also be stored.

With the charge/discharge control described above, it is possible to suppress the reduction in performance over time of a lithium ion secondary battery for use as a battery, so that a stable output can be obtained from the battery. Although in the above embodiment the battery charge/discharge control in a vehicle has been described, it is also possible to apply the present invention to a lithium ion secondary battery for other uses.

INDUSTRIAL APPLICABILITY

While the present invention can be used in the field in which a lithium ion secondary battery is used as a battery, the present invention can also be used for manufacturing vehicles, for example.

REFERENCE NUMERALS LIST 10 battery, 12 temperature sensor, 14 current sensor, 16 voltage sensor, 20 battery charge/discharge control device, 22 battery electronic control unit, 24 SOC estimation unit, 26 engine electronic control unit, 28 motor electronic control unit, 30 hybrid electronic control unit, 40 input-enabled power adjustment unit, 42 input-enabled current value calculation unit, 44 input power limit value calculation unit, 46 feedforward control battery input power limit value calculation unit, 50 booster converter also functioning as inverter, 52 motor, 54 generator, 56 power distribution and integration mechanism, 58 engine, 60 driving wheel, 100 hybrid vehicle.

The invention claimed is:

1. A battery charge/discharge control device comprising:
a control unit programmed to:
determine whether or not a charge history exists for a battery formed of a lithium ion secondary battery;
based on a determination that no charge history exists, calculate the input-enabled power according to a first calculation, based on an enabled charge current which is set as a maximum current with which metal lithium does not precipitate on the negative electrode, and based on a charge continuation time and a discharge continuation time;
based on a determination that the charge history exists, calculate the input-enabled power according to a second calculation, based on the enabled charge current which is set as the maximum current with which metal lithium does not precipitate on the negative electrode, and based on the charge continuation time and the discharge continuation time, wherein the second calculation is different from the first calculation;
change the enabled charge current such that the enabled charge current decreases in accordance with the charge continuation time and increases in accordance with the discharge continuation time,
adjust, during charge and discharge, the input-enabled power to the battery, such that a negative electrode potential of the battery is not lowered to a lithium reference potential, and
control a charge current to not exceed the enabled charge current,
wherein the battery charge/discharge control device is mounted on a motor-driven vehicle, and the battery is configured to supply power to a motor of the motor-driven vehicle and store electric power resulting from regenerative energy.

2. The battery charge/discharge control device according to claim 1, wherein
the control unit determines the input-enabled power based on an input current limit target value which is obtained by offsetting the enabled charge current by a predetermined amount.

3. A battery charge/discharge control device, comprising:
a battery current detection unit which detects a battery current;
a battery temperature detection unit which detects a battery temperature;
a charge/discharge estimation unit which estimates a state of charge of the battery; and
a control unit programmed to:
determine whether or not a charge history exists for a battery formed of a lithium ion secondary battery;
based on a battery current value, a battery temperature value, and an estimated charge capacity value at a time t upon execution of detection, obtain an input-enabled current value reduction amount per unit time during charge or an input-enabled current value recovery amount per unit time during discharge and also an enabled current amount recovery amount per unit time when being left uncontrolled, and calculate an input-enabled current value $I_{lim}(t)$ to the battery,
based on a determination that the charge history exists, the input-enabled current value $I_{lim}(t)$ is calculated based on a previously calculated input-enabled current value $I_{lim}(t-1)$ which has been calculated previously;
based on a determination that no charge history exists, the input-enabled current value $I_{lim}(t)$ is calculated based on an only initially set input-enabled current value $I_{lim}(0)$; and
calculate a battery input power limit value based on the input-enabled current value $I_{lim}(t)$ which is obtained, and
adjust the input-enabled power to the battery based on the battery input power limit value which is obtained,
adjust, during charge and discharge, an input-enabled power to the batter, such that a negative electrode potential of the battery is not lowered to a lithium reference potential, and
control a charge current to not exceed the enabled charge current,
wherein the battery charge/discharge control device is mounted on a motor-driven vehicle, and the battery is configured to supply power to a motor of the motor-driven vehicle and store electric power resulting from regenerative energy.

4. The battery charge/discharge control device according to claim 3, wherein
the control unit calculates the battery input power limit value based on an input current limit target value obtained by decreasing the input-enabled current value $I_{lim}(t)$ by a predetermined amount.

5. The battery charge/discharge control device according to claim 3, wherein
the control unit further calculates an input-enabled current value $I_{lim}'(t)$ to the battery, obtained by adding a degradation state of lithium ion secondary battery to the input-enabled current value $I_{lim}(t)$ which is obtained, and
calculates the battery input power limit value based on the input-enabled current value $I_{lim}(t)$ which is obtained.

6. The battery charge/discharge control device according to claim 3, wherein the control unit obtains an input current limit target value by adding a degradation state of the lithium ion secondary battery to the input-enabled current value $I_{lim}(t)$ which is obtained.

7. The battery charge/discharge control device according to claim 4, wherein the control unit obtains the input current limit target value by adding a degradation state of the lithium ion secondary battery to the input-enabled current value $I_{lim}(t)$ which is obtained.

8. The battery charge/discharge control device according to claim 4, wherein the control unit calculates a battery input power limit value Win(t) from a difference between a power value in accordance with a difference between the input current limit target value and an actual battery current value, and a predetermined battery input power limit prescribed value $SW_{in}(t)$.

9. The battery charge/discharge control device according to claim 1, further comprising:

the control unit executes control such that an upper limit voltage of the lithium ion secondary battery does not exceed a predetermined upper limit voltage.

10. The battery charge/discharge control device according to claim 2, wherein the control unit calculates input power to the battery which is obtained when the enabled charge current flows and determines the input-enabled power based on the input power which is calculated.

11. The battery charge/discharge control device according to claim 4, wherein the control unit further obtains a battery voltage Vtag(t) which is obtained when the input current limit target value Itag(t) is set to a charge current, calculates a base power SWin'(t) from the input current limit target value Itag(t) and the voltage Vtag(t), and determines the input-enabled power to the battery based on the base power SWin'(t) and a difference between the input current limit target value Itag(t) and an actual battery current value.

12. The battery charge/discharge control device according to claim 6 comprising:

a use period storage unit which stores a period of use which is counted in a cumulative manner from a time when the battery is mounted, wherein the control unit changes the degradation state of the lithium ion secondary battery in accordance with the period of use of the battery which is obtained from the use period storage unit.

13. A hybrid vehicle which includes a motor and an engine and travels by a driving force of at least one of the motor and the engine, the hybrid vehicle comprising:

the battery and the battery charge/discharge control device according to claim 1.

14. A hybrid vehicle which includes a motor and an engine and travels by a driving force of at least one of the motor and the engine, the hybrid vehicle comprising:

the battery and the battery charge/discharge control device according to claim 3.

15. The battery charge/discharge control device according to claim 1, wherein the control unit compares the charge current with the enabled charge current, and based on a result of the comparison, controls the charge current such that the charge current does not exceed the enabled charge current.

* * * * *